(12) United States Patent
Zadro et al.

(10) Patent No.: US 10,281,136 B2
(45) Date of Patent: May 7, 2019

(54) ILLUMINATING TWEEZERS

(71) Applicants: Zlatko Zadro, Huntington Beach, CA (US); Alexander Ivan Zadro, Huntington Beach, CA (US); Elizabeth Zadro Weber, Huntington Beach, CA (US)

(72) Inventors: Zlatko Zadro, Huntington Beach, CA (US); Alexander Ivan Zadro, Huntington Beach, CA (US); Elizabeth Zadro Weber, Huntington Beach, CA (US)

(73) Assignee: Zadro Products, Inc., Huntington Beach, CA (US)

( * ) Notice: Subject to any disclaimer, the term of this patent is extended or adjusted under 35 U.S.C. 154(b) by 0 days.

(21) Appl. No.: 15/430,519

(22) Filed: Feb. 12, 2017

(65) Prior Publication Data

US 2018/0231237 A1 Aug. 16, 2018

(51) Int. Cl.
| | |
|---|---|
| F21L 4/00 | (2006.01) |
| F21V 33/00 | (2006.01) |
| G02B 27/12 | (2006.01) |
| A45D 26/00 | (2006.01) |
| F21V 23/04 | (2006.01) |
| F21V 7/00 | (2006.01) |
| F21Y 115/10 | (2016.01) |

(52) U.S. Cl.
CPC ...... F21V 33/0084 (2013.01); A45D 26/0066 (2013.01); G02B 27/123 (2013.01); A45D 2026/008 (2013.01); F21L 4/00 (2013.01); F21V 7/0091 (2013.01); F21V 23/0421 (2013.01); F21Y 2115/10 (2016.08)

(58) Field of Classification Search
CPC .............. F21V 33/0084; F21V 7/0091; F21V 23/0421; F21V 33/00; F21V 33/0004; F21V 33/004; F21V 33/008; F21V 2200/00; A45D 26/0066; F21L 4/00; G02B 27/123; F21Y 2115/10
See application file for complete search history.

(56) References Cited

U.S. PATENT DOCUMENTS

| 2,376,448 A * | 5/1945 | Neugass | A45D 26/0066 |
| | | | 294/99.2 |
| 3,287,547 A * | 11/1966 | Spedding | F21V 33/00 |
| | | | 294/99.2 |

(Continued)

*Primary Examiner* — Bao Q Truong
(74) *Attorney, Agent, or Firm* — UltimatEdge IP Law Group, P.C.; Dean G. Stathakis; William L. Chapin

(57) ABSTRACT

An illuminating tweezers for grasping and manipulating small articles includes a single light emitting diode (LED) and powering battery located in an upper centrally-located barrel end of a monolithic body made of a light transmissive polymer. A beam-splitter lens molded into the body splits a single beam of light emitted by the LED into a pair of beams which are directed into upper ends of a pair of elastically bendable arms that depend downwardly from opposed longitudinal sides of the barrel. The pair of light beams are conducted downwardly through the arms by total internal reflection, and reflected downwardly and inwardly towards an illumination region located between lower ends of the arms by downwardly and inwardly oriented oblique end faces at lower ends of the arms.

13 Claims, 16 Drawing Sheets

(56) References Cited

U.S. PATENT DOCUMENTS

| | | | | |
|---|---|---|---|---|
| 6,988,814 B1* | 1/2006 | Correa | ................... | A61B 17/30 |
| | | | | 362/109 |
| 2004/0181255 A1* | 9/2004 | Gio | ....................... | A61B 17/30 |
| | | | | 606/210 |
| 2008/0243181 A1* | 10/2008 | Schneider | ................. | B25B 9/02 |
| | | | | 606/211 |
| 2010/0295326 A1* | 11/2010 | Chen | ........................ | B25B 9/02 |
| | | | | 294/99.2 |

* cited by examiner

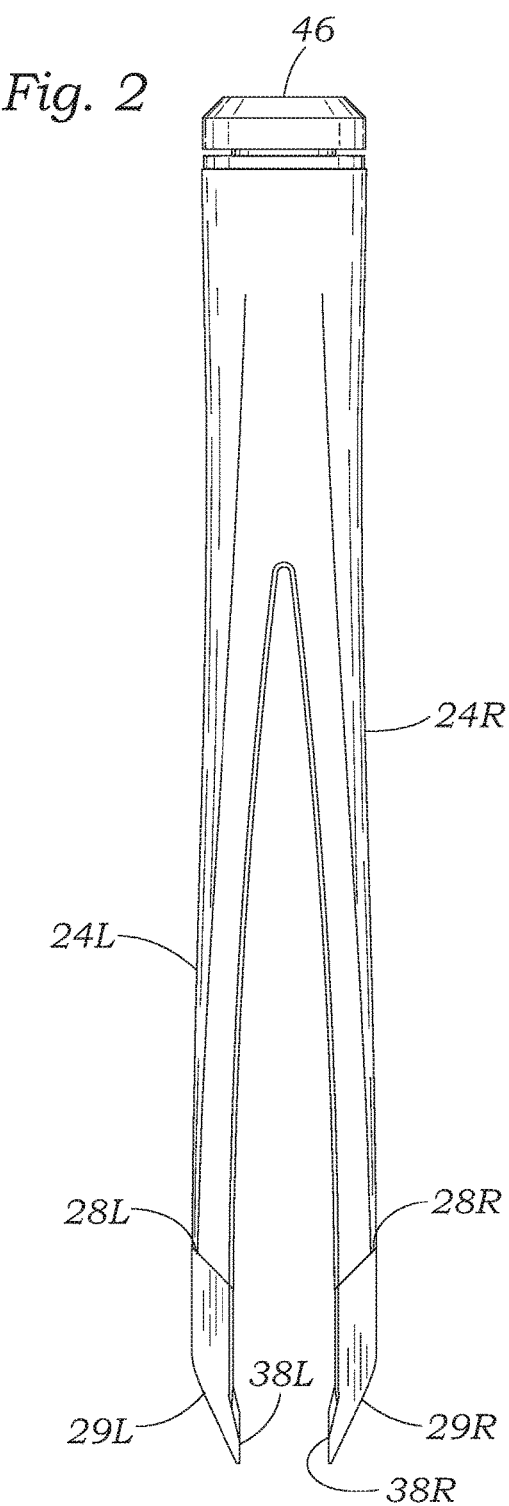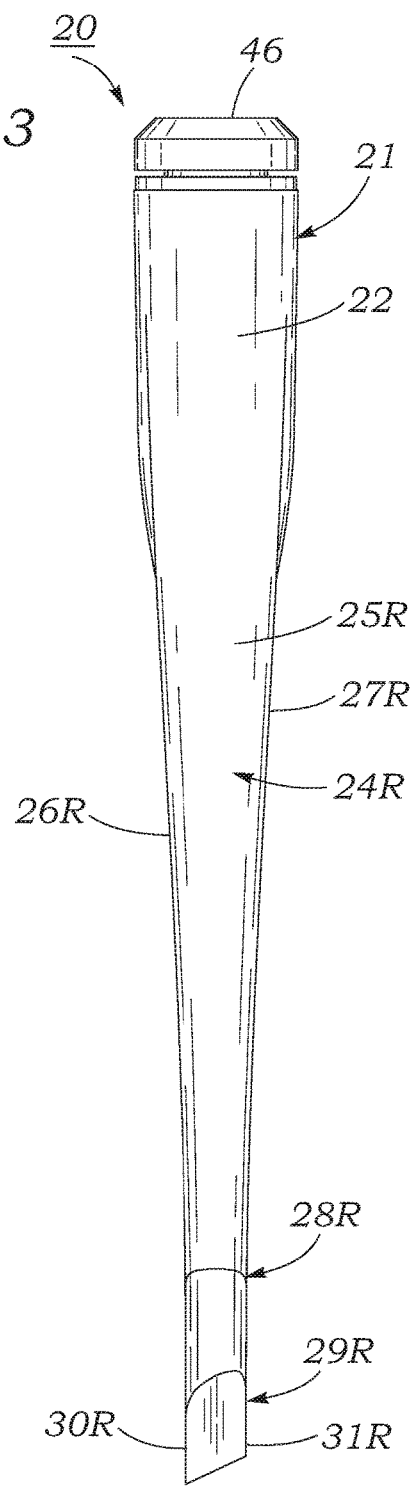

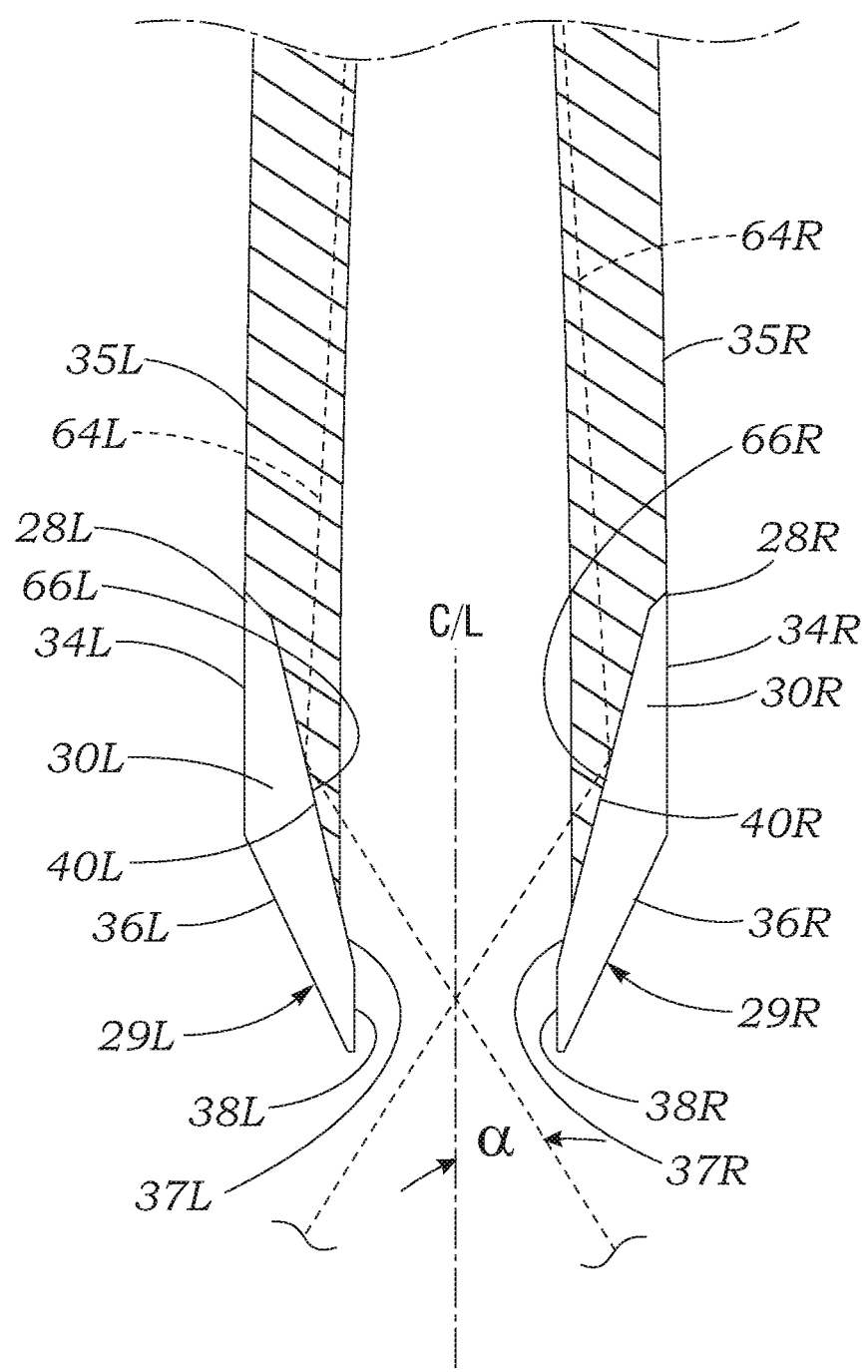

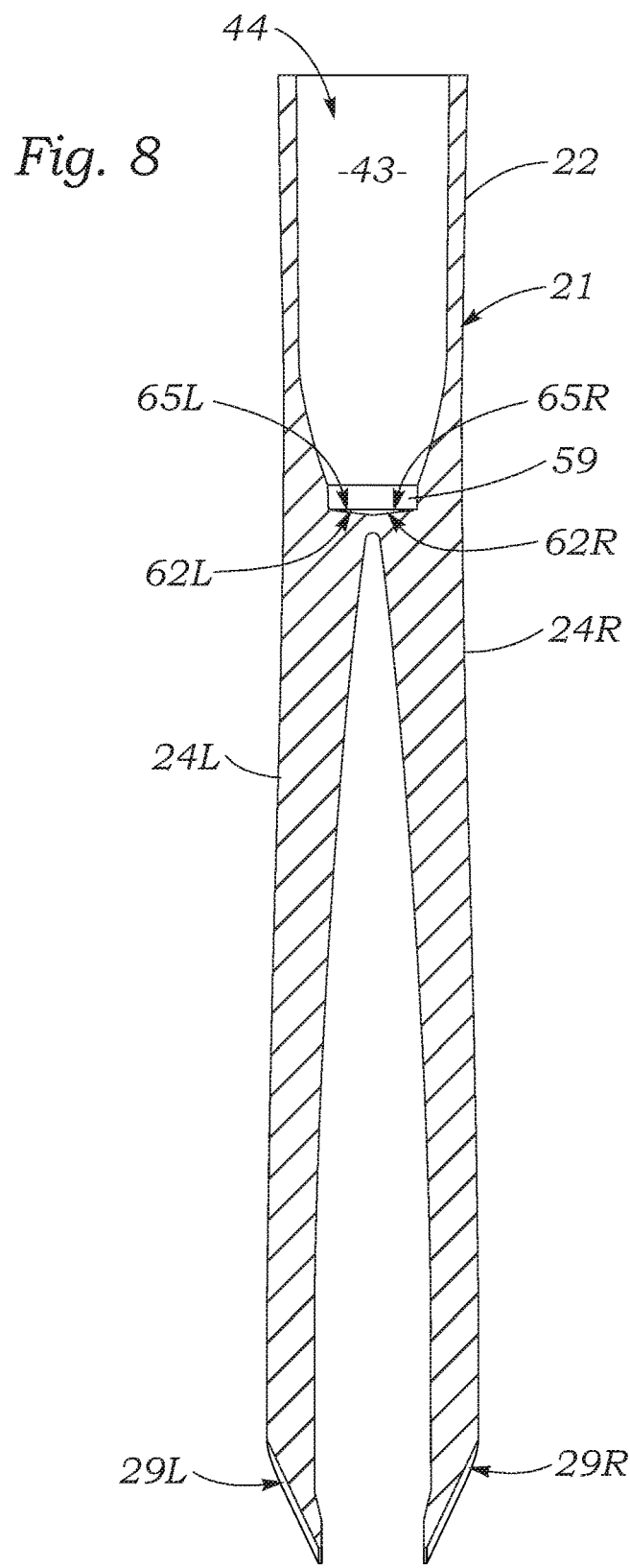

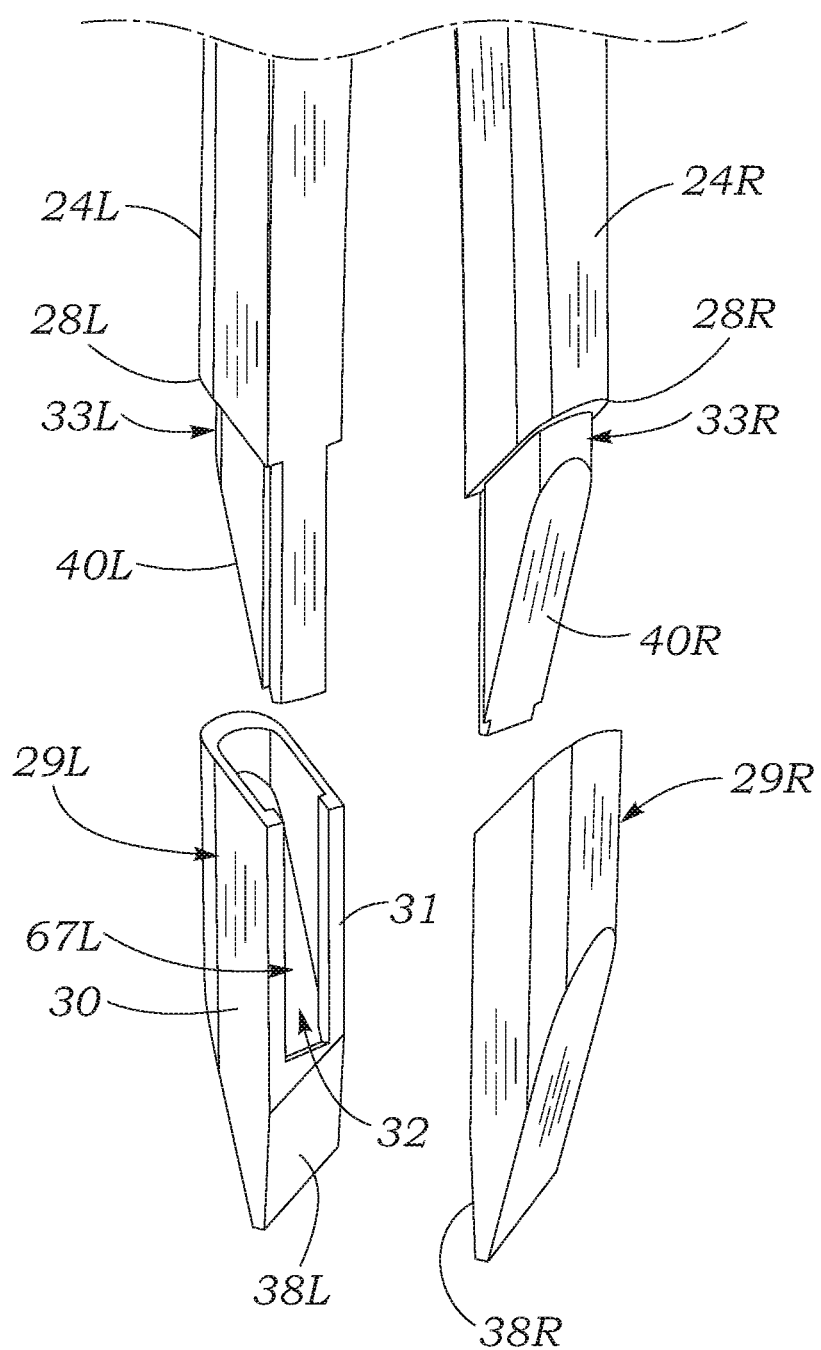

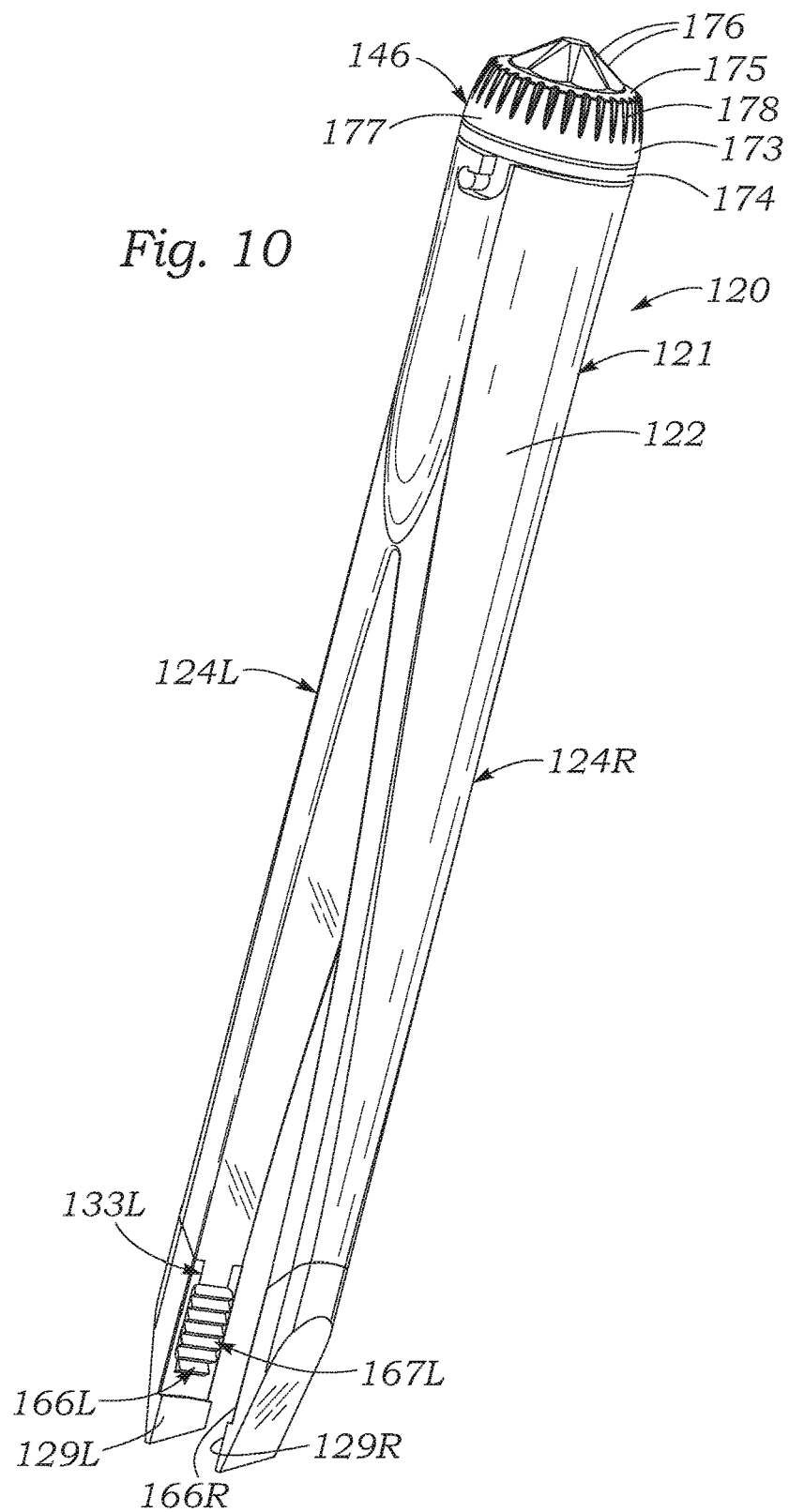

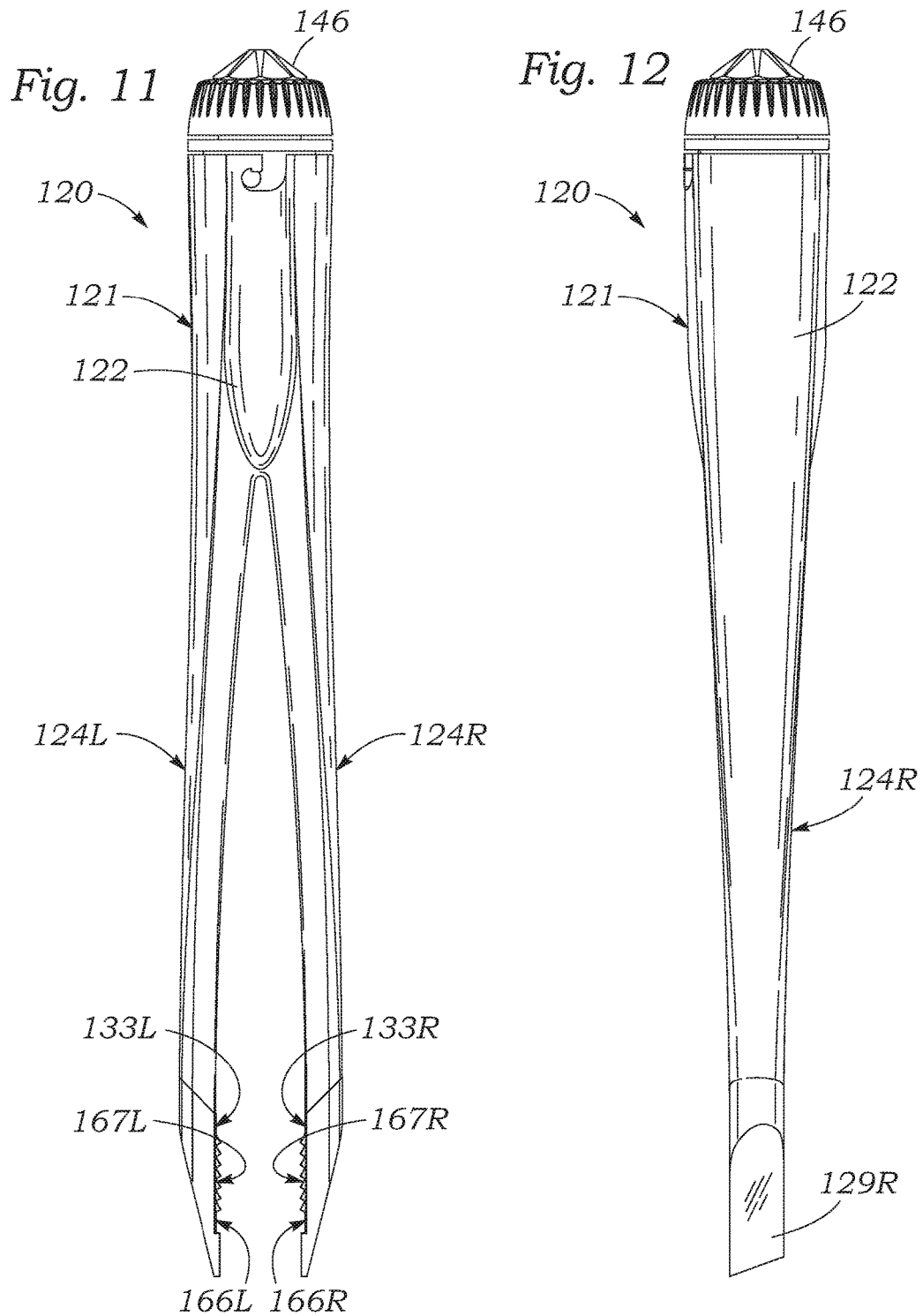

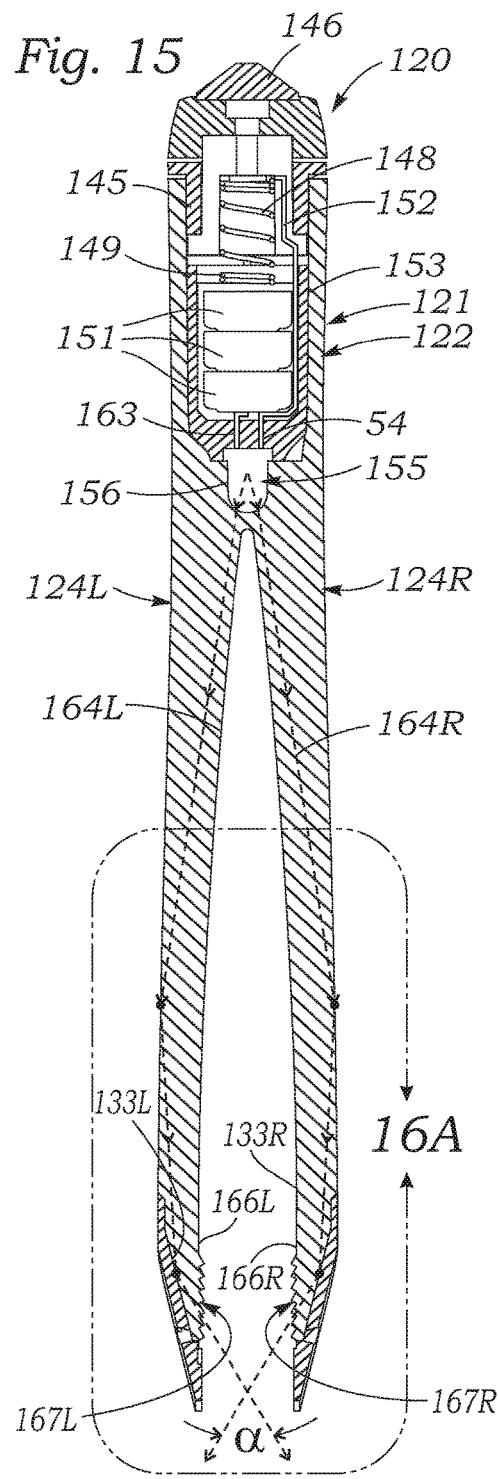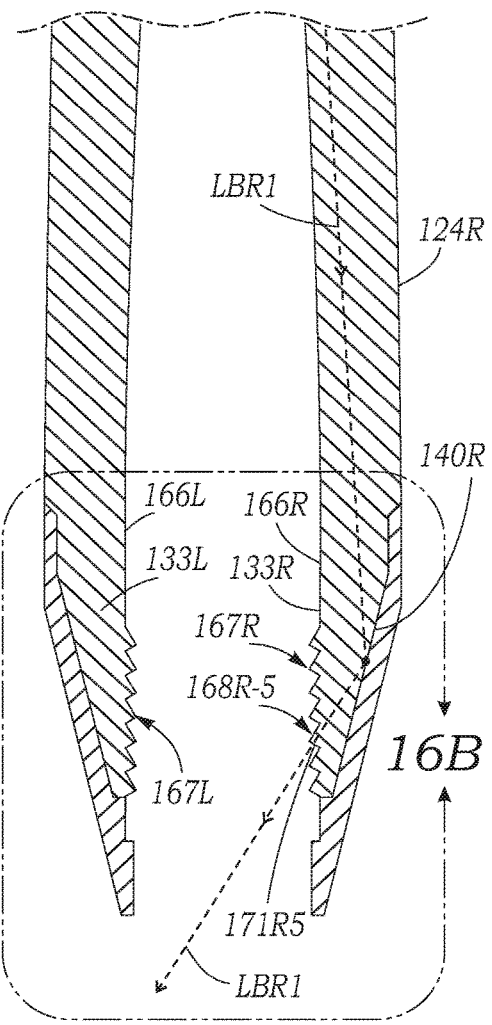

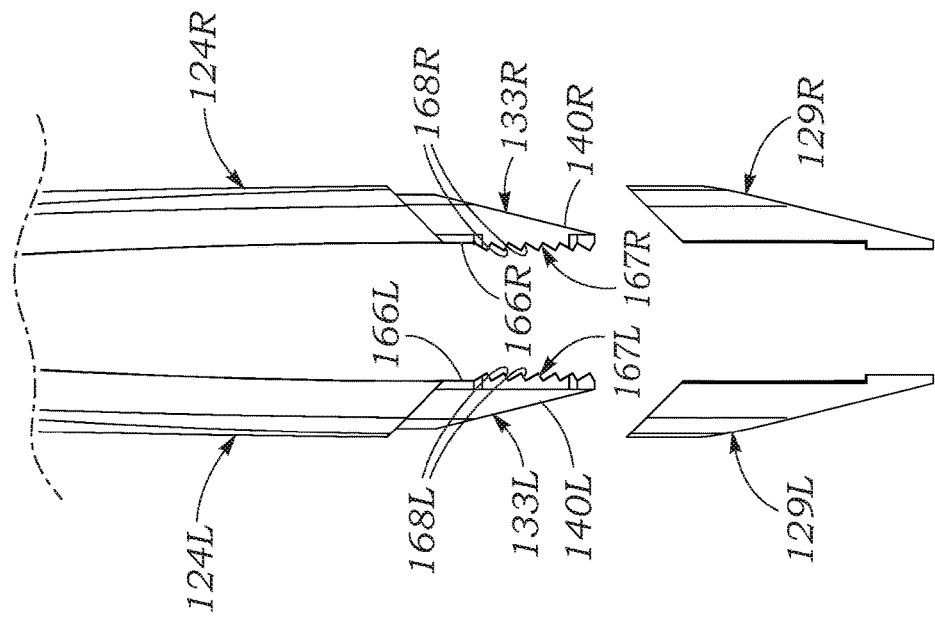
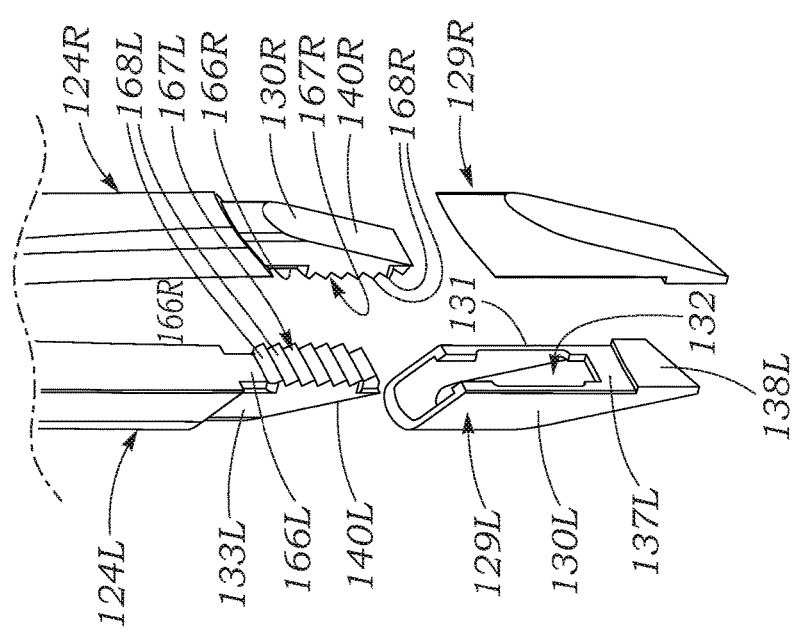

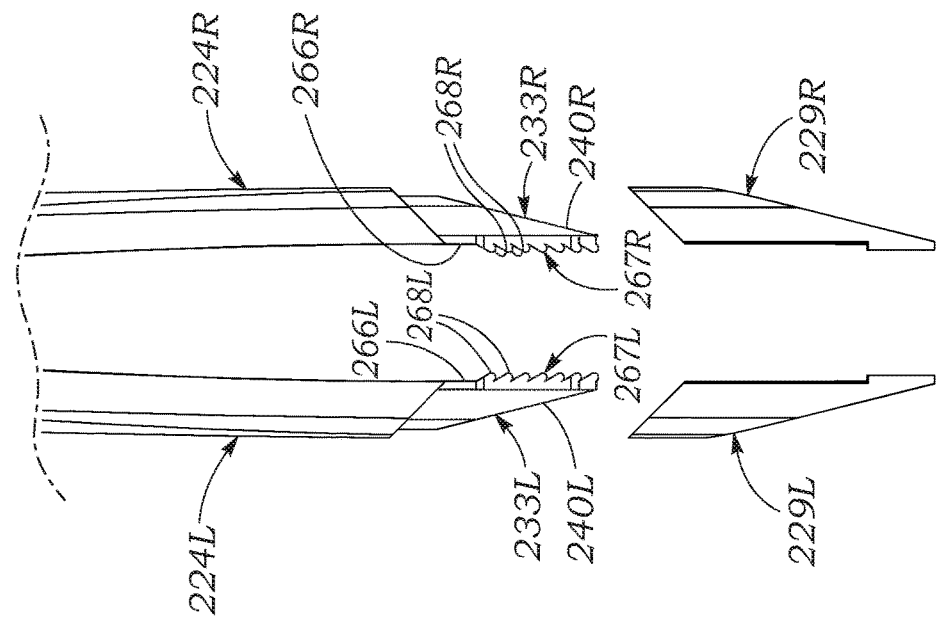
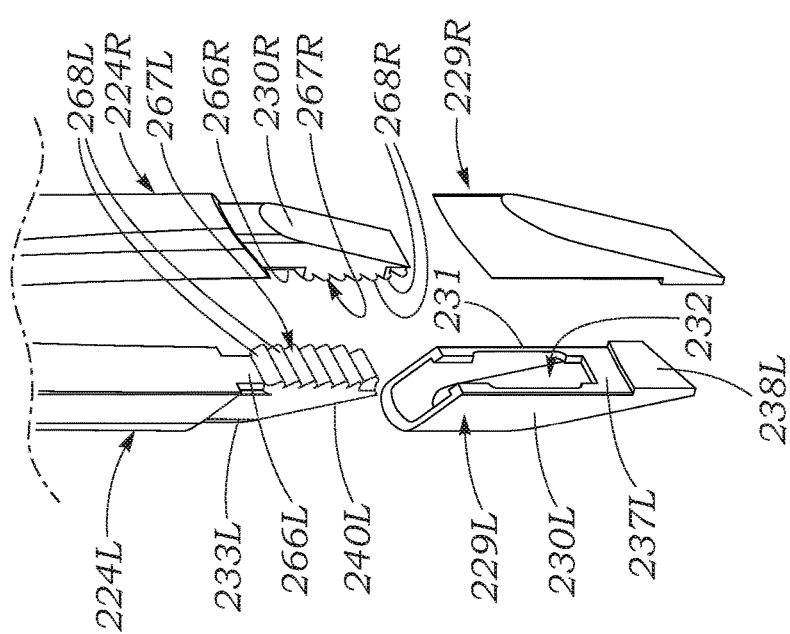

ILLUMINATING TWEEZERS

BACKGROUND OF THE INVENTION

A. Field of the Invention

The present invention relates to small hand-held tools and implements, particularly tweezers of the type which are used for personal care functions such as plucking eyebrow hairs, or for gripping and manipulating articles such as tiny screws, fasteners, and the like. More specifically, the invention relates to a novel illuminating tweezers which contains an internal battery powered illuminator, that effectively illuminates a region between tips of the tweezers, thus facilitating positioning of the tips to grasp and manipulate small articles.

B. Description of Background Art

A simple and widely used tool, which is referred to variously as a pair of tweezers, tweezers, or simply a tweezer, consists essentially of a pair of elongated arms which are joined together at upper ends thereof. The arms have at lower ends thereof a pair of opposed tips which can be pressed together by exerting finger pressure on the arms to thus grasp small articles. The arms of most tweezers are elastically biased apart to maintain the tips in a spaced-apart relationship when the arms are not pressed together. Tweezer arms are typically bowed outwardly and biased away from one another by spring tension in the arms. Tweezers are used by squeezing the arms between the fingers to thereby press the tips together and thus exert a compressive force on an article to be manipulated, such as eyebrow hairs, small screws, fasteners, or other such articles.

Since tweezers are most often used to grasp and manipulate articles which are quite small, positioning the tweezer tips relative to an article can sometimes be visually challenging. Accordingly, it has been recognized that providing a light source as part of an improved tweezers would be desirable. For example, U.S. patent application publication No. US 2008/0243181. Schneider et al., discloses a Touch-Switched Luminous Plastic Tweezers which has a pair of light-emitting diodes, (LEDs) located at upper ends of a pair of light transmissive branches which conduct light emitted by the LEDs through tip ends of the branches to thereby illuminate a region between the tips.

The present invention was conceived of and developed to provide an improved tweezers which is highly effective in illuminating work areas in which the tips of the tweezers may be positioned.

OBJECTS OF THE INVENTION

An object of the present invention is to provide an improved tweezers which can be held in a person's hand and used to grasp and manipulate small objects such as eyebrow hairs, small screws, or other such items, the tweezers having an internal light source which effectively illuminates a region between grasping tips of the tweezers.

Another object of the invention is to provide an illuminating tweezers which has an LED light source located in an upper tubular barrel end of the tweezers, and a pair of opposed outwardly bowed light transmissive flexible arms which depend downwardly from the barrel and conduct light emitted by the LED light source to a region located between grasping tips at the lower ends of the tweezer arms.

Another object of the invention is to provide an illuminating tweezers which includes a light source consisting of a single LED located in an upper barrel end of the tweezers, and a lens which is effective in diffracting light emitted by the LED into a pair of beams directed into the upper ends of a pair of laterally opposed, outwardly bowed light transmissive arms which depend downwardly from the barrel, the beams exiting inwardly and downwardly from opposed inner-facing sides of lower ends of the arms which have thereat a pair of grasping tips, to thereby illuminate a region between the grasping tips.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved hand-held tweezers, of a type which may be used for personal care functions, or for grasping and manipulating small objects such as set screws, small fasteners, electronic components, and the like. The improved tweezers according to the present invention has an integral illuminator which is effective in illuminating a region located between grasping tips of the tweezers. The illumination aids users of the tweezers in viewing small objects and positioning the tweezer tips relative to an object in an orientation which facilitates grasping and manipulating an object.

An illuminating tweezers according to the present invention includes a pair of longitudinally elongated, laterally opposed flexible arms. The arms are joined together at upper ends thereof, and are bowed outwardly from one another by spring tension, so that a pair of opposed grasping tips on the lower ends of the arms are normally spaced apart. The tips can be moved inwardly to grasp an object located between the tips, by exerting finger pressure on outer sides of the arms to thus elastically flex the arms inwardly towards one another.

According to the invention, the arms of illuminating tweezers are light transmissive and depend downwardly from an integral illuminator located above the upper ends of the arms. The illuminator includes a hollow tubular body or barrel which has a longitudinal axis that is collinear with a longitudinal center line of the tweezers. A hollow cylindrically shaped cavity within the barrel holds in an upper part thereof a light source contained in a generally cylindrically shaped housing, which has a tapered lower end that gives it a bullet-like shape. The housing holds a battery consisting of a vertical stack of one or more circular disk-shaped coin cells. The coin cell battery is connected through an electrical on/off switch located in the upper part of the housing to a single light emitting diode (LED) in a lower end of the housing. The LED has an optical axis which is collinear with the longitudinal center line of the tweezers, a cylindrical body and a hemispherical dome shaped lens at the lower end of the body. The LED lens protrudes through a bore centrally located in the tapered lower end of the illuminator housing, and is received in a lower blind LED lens cavity which extends coaxially downwardly from the upper cavity that holds the housing containing the battery, switch and LED body.

The illuminating tweezers according the invention includes a lens body which is located below the LED lens. The lens body functions as a beam splitter, and is effective in splitting visible light emitted from the LED into two separate beams, i.e., left and right beams which are directed into upper light transmissive transverse ends of the arms. The arms and lens body are made of a light transmissive material such as a polycarbonate plastic or other such light transmissive polymer, preferably as a single molded part. Each of the two light beams is diffracted by the lens body into a separate arm at a small, grazing incident angle relative to the center line of the arm. Thus directed, the incident light beams are conducted downwardly through the arms by total internal reflection.

The illuminating tweezers according to the present invention also includes an optical surface located at a lower end of each arm, which is effective in redirecting light which has been transmitted downwardly through the arms, inwardly and downwardly towards a region located between tips of the arms. In one embodiment of the illuminating tweezers according to the present invention, the redirecting optical surface includes an optically reflective upper oblique surfaces of each one of a pair of metal grasping tips, one each of which is fixed to the lower end of each arm. The oblique reflective surface of each grasping tip is angled downwardly and inwardly towards a longitudinal center plane of the illuminating tweezers. With this construction, light beams which are conducted downwardly through the arms and transmitted through the lower oblique inner sides of the arms are reflected downwardly and inwardly into an illumination region located between and below the grasping tips of the tweezers.

In a preferred embodiment of an illuminating tweezers according to the present invention, at least the barrel, arms, and lens body of the tweezers are fabricated as a single, unitary monolithic article. For example, the arms, barrel, and beam splitter lens body of this embodiment of the illuminating tweezers can comprise different regions of a single part which is injection-molded from a polycarbonate or other light transmissive plastic. According to one aspect of the invention, a pair of metal gripper tips may be positioned in an injection mold, and arranged so that molten plastic forming lower ends of the tweezer arms flow into cavities within the metal tips so that each tip is securely fixed to the lower end of an arm when the molten plastic solidifies.

According to another aspect of the invention, the tweezers body, lens body, and arms may be injection-molded from a material such as fiberglass-filled nylon, which has a hardness great enough to negate a requirement for separate metal grasping tips. In this embodiment, light may be redirected into a region between the tips of the tweezers by total internal reflection from the inner surfaces of a lower oblique plane faces on the outer lateral sides of each of the arms. The oblique faces are arranged so that internal light beams transmitted downwardly through each of the arms impinge the oblique planar surfaces at the lower end of each of the arms at an angle greater than the critical angle for total internal reflection, for the particular polymer from which the tweezer arms are made. Light rays reflected internally from each oblique face are transmitted through light exit regions consisting of inner lateral sides of the arms into an exterior illumination region between the tips of the tweezer arms.

According to another aspect of the invention, opposed inner-facing longitudinal surfaces of laterally inwardly located lower ends of the tweezer are arms have a sawtooth shape comprised of a longitudinally disposed series of wedge-shaped steps. Lower faces of each of the steps are angled to internally reflected light rays at small incident angles. Thus the lower sawtooth faces of each of the steps serve as light exit regions which enhance the effectiveness of transmission of internally reflected light rays outwardly through the sawtooth faces into an exterior illumination region.

BRIEF DESCRIPTION OF THE DRAWINGS

FIG. 2 is a front elevation view of the Illuminating tweezers of FIG. 1.

FIG. 3 is a right side elevation view of the Illuminating tweezers of FIG. 1.

FIG. 7 Is a fragmentary longitudinal sectional view of the Illuminating tweezers of FIG. 6 on an enlarged scale, showing paths of light beams in the arms of the tweezers.

FIG. 8 is a fragmentary longitudinal sectional view of the illuminating tweezers of FIG. 1 showing the tweezers with a light source thereof removed.

FIG. 9 is a fragmentary exploded view of the illuminating tweezers of FIGS. 6 and 8, showing grasping tips of the tweezers separated from the tweezer arms.

FIG. 10 is a perspective view on an enlarged scale of a variation of an Illuminating tweezers according to the present invention, which has stepped tips.

FIG. 11 is a front elevation view of the Illuminating tweezers of FIG. 10.

FIG. 12 is a right side elevation view of the Illuminating tweezers of FIG. 10.

FIG. 15 is a longitudinal sectional view of the Illuminating tweezers of FIG. 13, taken in the direction of line 15-15.

FIG. 16A Is a fragmentary longitudinal sectional view of the Illuminating tweezers of FIG. 15 on an enlarged scale, showing center paths of light beams in the arms of the tweezers.

FIG. 18 is a fragmentary exploded perspective view of the illuminating tweezers of FIGS. 6 and 8, showing grasping tips of the tweezers separated from the tweezer arms.

FIG. 19 is a front elevation view of the tweezers of FIG. 18.

FIG. 20 is a fragmentary exploded perspective view on an enlarged scale of a modification of the stepped-tips illumination tweezers shown in FIGS. 10-19.

FIG. 21 is a fragmentary front elevation view of the modified stepped-tips illuminated tweezers shown in FIG. 20.

DESCRIPTION OF THE PREFERRED EMBODIMENTS

FIGS. 1-9 illustrate details of the construction and functions of an Illuminating tweezers according to the present invention.

Figure 1:
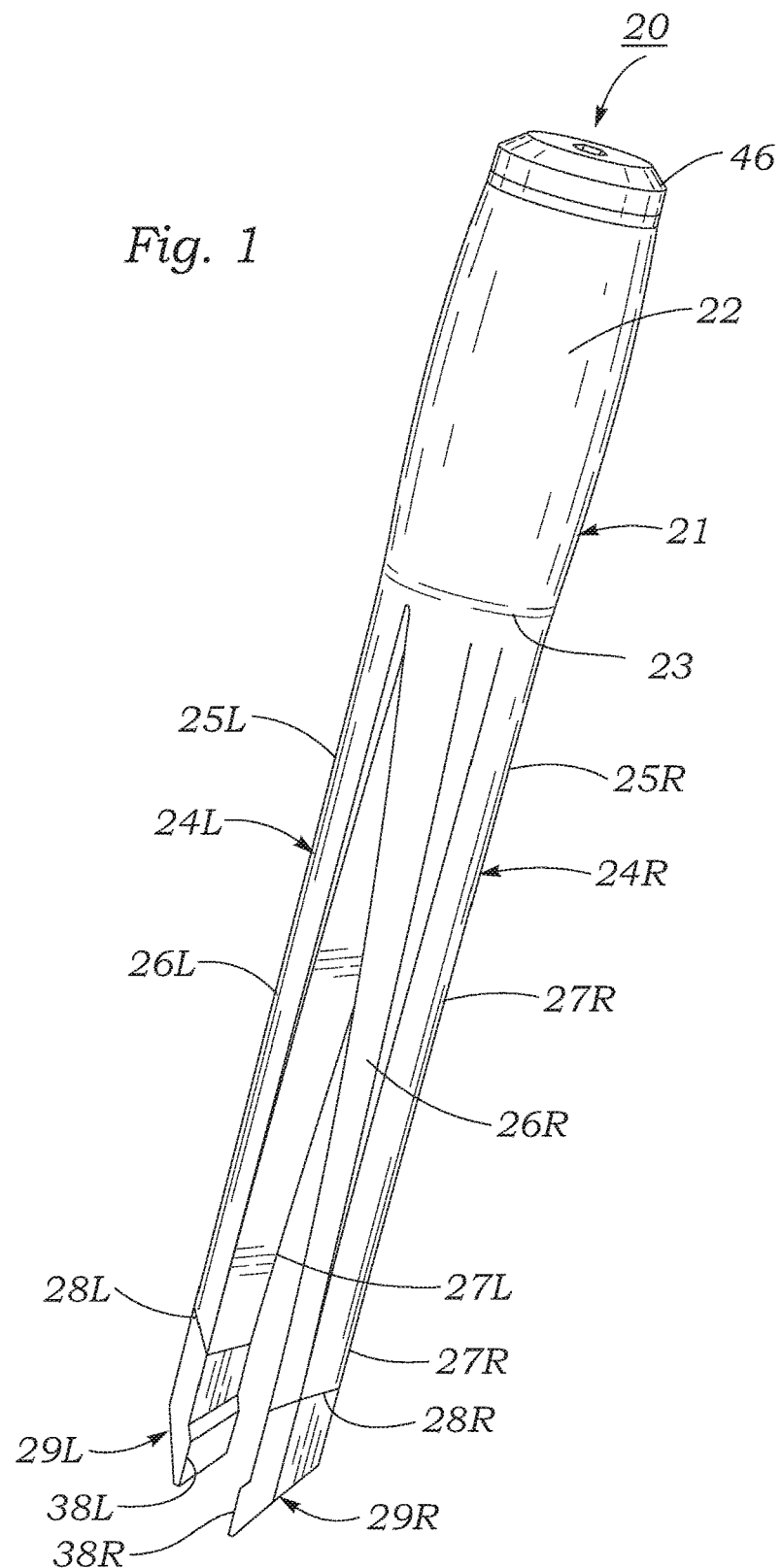
FIG. 1 is a perspective view on an enlarged scale of an Illuminating tweezers according to the present invention.
Figure 4:
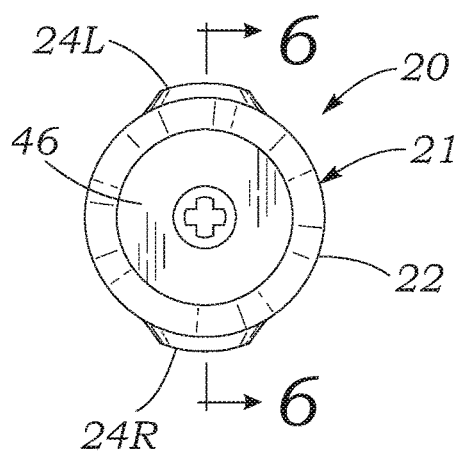
FIG. 4 is a top plan view of the Illuminating tweezers of FIG. 1.
Figure 5:
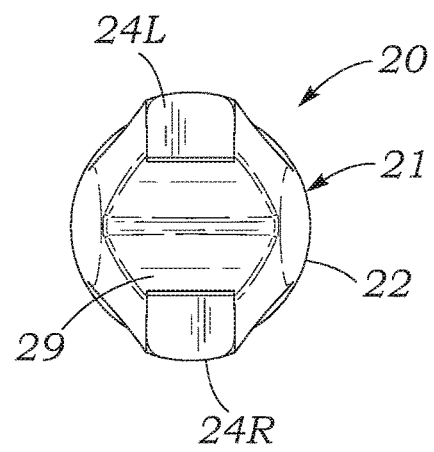
FIG. 5 is a bottom plan view of the Illuminating tweezers of FIG. 1.

As shown in FIGS. 1-5, an illuminating tweezers 20 according to the present invention includes an elongated laterally symmetric body 21. Body 21 has at its upper end thereof a circular cross-section, longitudinally elongated barrel 22, which has a longitudinal axis that is collinear with a longitudinal center line of the tweezers. As shown in FIGS. 1-3, barrel 22 has extending downwards from a lower transverse end 23 of the barrel a pair of laterally mirror symmetric, laterally opposed, outwardly bowed left and right arms 24L, 24R.

As shown in FIG. 2, arms 24L, 24R of tweezers 20 have outer longitudinally disposed sides 25L, 25R, which are continuous downwardly disposed extensions of outer lateral sides of barrel 22.

As may be understood best by referring to FIG. 3, tweezer arms 24L, 24R have front and rear sides 26L, 27L and 26R, 27R, respectively, lower sections of which taper inwardly towards one another. Thus as shown in FIG. 3, lower "wrist" end sections 28L, 28R of arms 24L, 24R have fore-and-aft diameters which are smaller than the diameter of barrel 22.

Figure 6:
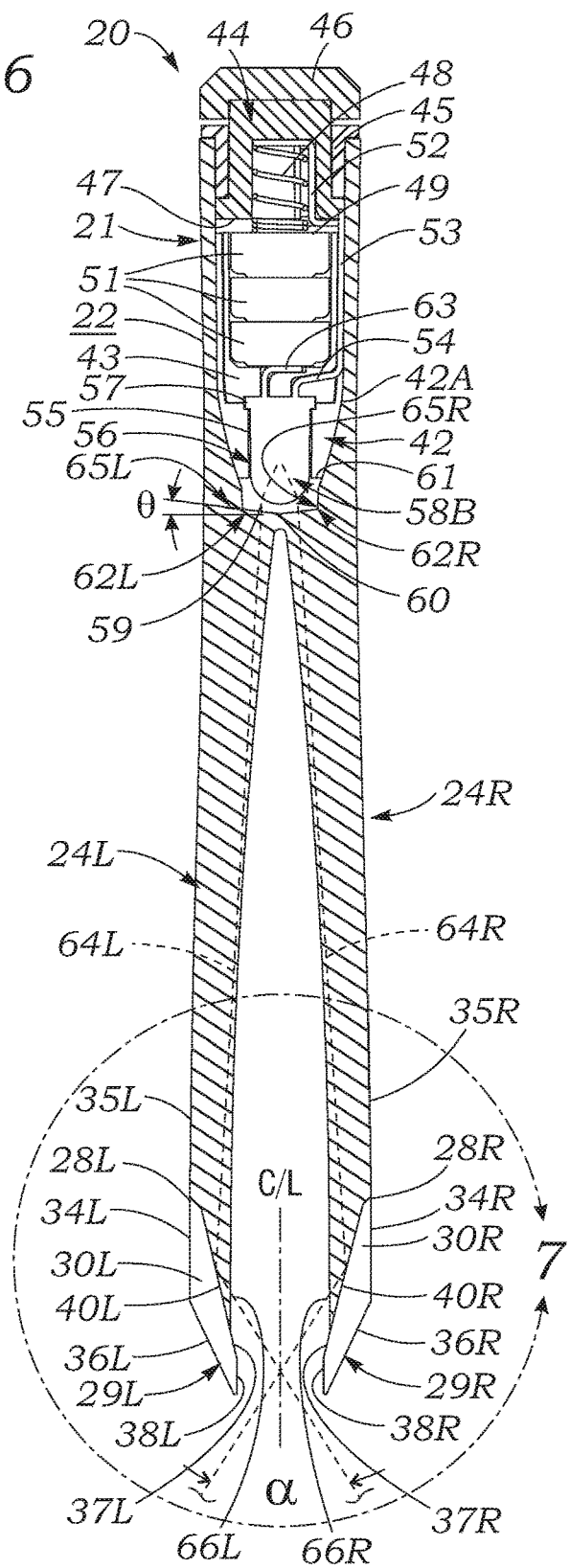
FIG. 6 is a longitudinal sectional view of the Illuminating tweezers of FIG. 4, taken in the direction of line 6-6.

Referring to FIGS. 1, 2, and 6-9, it may be seen that lower end sections 28L, 28R of tweezer arms 24L, 24R have at lower ends thereof an opposed pair of grasping tips 29L, 29R. As may be seen best by referring to FIGS. 2 and 9, each grasping tip 29 has in front and rear elevation views a shape approximating that of a hollow generally triangular cross-section prism. Thus as shown in FIGS. 6 and 7, each tip 29 has in front elevation view a vertically elongated, triangular cross-section prismatic shape which includes parallel, generally triangularly shaped front and rear faces 30, 31. As may be seen best by referring to FIG. 9, front and rear faces 30, 31 of each tip 29 have formed there between a similarly shaped groove 32 for insertably receiving therein the lower wedge shaped end 33L, 33R of a left or right tweezer arm 24L, 24R.

As may be seen best by referring to FIGS. 6 and 7, front and rear faces 30, 31 of grasping tips 29 have a shape approximating that of an isosceles triangle, including a first superior upper side 34 which is collinear with an outer side 35 of a tweezer leg, a second, inferior upper side 36, and a base side 37. Base sides 37L, 37R of left and right grasping tips 29L, 29R are angled obliquely towards a vertical fore-and-aft center plane of tweezer body 21. Preferably, as shown in FIGS. 6 and 7, base side 37 of each tweezer grasping tip 29 is intersected by an obliquely angled truncating plane 38. Left and right truncating planes 38L, 38R of left and right grasping tips 29L, 29R have outer faces 41L, 41R which are laterally spaced apart and approximately parallel when arms 24L, 24R of tweezers 20 are in a relaxed, non-compressed state.

As may be understood by referring to FIGS. 6, 8, and 9, grooves 32L, 32R of grasping tips 29L, 29R have flat, obliquely inwardly and downwardly angled flat bottom inner faces 39L, 39R. The bottom flat faces 39L, 39R are of a suitable size and shape to make flat underlying contact with similarly shaped lower oblique faces 40L, 40R of tweezer arms 24L, 24R. As shown in FIG. 6, each lower oblique face 40 of a tweezer arm 24 is angled obliquely downwardly and inwardly from a longitudinal axis of the arm.

For reasons which are described below, bottom flat faces 39L, 39R of grooves 32L, 32R in left and right grasping tips 29L, 29R may have surfaces which are highly reflective to visible wave-length light. Thus these surfaces may be metallized surfaces of a polymer plastic material. Alternatively, grasping tips 29L, 29R may be made of metal, in which case lower faces 39L, 39R of the gripper tips 29L, 29R would be highly polished. These surfaces may also be chrome plated.

FIGS. 6 and 8 illustrate novel construction details of illuminating tweezers 20 which enable the tweezers to be highly effective in illuminating a region located between and below opposing faces 41L, 41R of grasping tips 29L, 29R, thus aiding a user in viewing, grasping, and manipulating small objects located near the tips.

As shown in FIG. 6, tweezers 20 includes a light source 42 which is contained in a cylindrical bullet shaped housing 42A located in barrel 22. Housing 42A of light source 42 fits conformally within a longitudinally elongated, cylindrically shaped cavity 43 which is located coaxially within barrel 22. Cavity 43 has an upper circular entrance opening 44 in which is located a circular cup-shaped control knob 46 of a rotary electrical ON-OFF switch 45. Switch 45 has an electrical power contact 47 which is in electrically conductive contact with the upper end of a helical compression spring 48. The lower end of compression spring 48 is urged resiliently against the upper flat circular surface 49 of a button cell battery 50, which consists of a longitudinally disposed stack of one or more individual button cells 51. Upper surface 49 of upper button cell 51 constitutes the positive polarity terminal of battery 50.

Switch 45 has at an upper end thereof an electrically conductive, load-side contact 52 which is connected through an electrical conductor 53 to the positive anode lead 54 of a cylindrically shaped light emitting diode (LED) 55. LED 55 has an elongated cylindrically shaped body 56 which extends coaxially from a larger diameter annular ring shaped base flange 57. Body 56 of LED 55 has extending coaxially downwards from a lower transverse end thereof a hemispherical dome shaped lens 58. Lens 58 fits conformally within a similarly shaped bore 57 which extends longitudinally downwards into a solid transparent lens body 59 which has an upper surface that forms a lower transverse end wall of cavity 43.

As shown in FIG. 6, lens body 59 has a lower surface 60 which is coextensive with an upper web section 61 of body 21 of tweezers 20, which joins the upper base ends of tweezer arms 24L, 24R. Lens body 59 has a pair of lower planar surfaces 62L, 62R which extend laterally outwards from opposed sides of a vertical center plane of body 21. Planar surfaces 62 are each angled upwardly from a transverse plane of barrel 22 at a small angle of, say, about 7 degrees. Body 21 of tweezers is made of a light transmissive material, such as a clear polycarbonate plastic.

Light source 42 of tweezers 20 includes a negative cathode lead 63 which extends upwardly from the base 57 of LED 55, and is electrically conductively connected to a lower, negative terminal of battery 50.

The above-described construction of tweezers 20 facilitates efficient splitting of light emitted by LED 55 into left and right beams 64L, 64R which are directed into the upper base ends 65L, 65R of left and right tweezer arms 24L, 24R, respectively. As may be understood by viewing FIGS. 6 and 8, left and right light beams 64L, 64R are transmitted through tweezer arms 24L, 24R by total internal reflection, and impinge on lower oblique end faces 40L, 40R of tweezer arms 24L, 24R.

It should be understood that light beams 64L, 64R, although shown in FIGS. 6 and 7 as single rays for simplicity, actually consist of bundles of light rays which are emitted through the diffuse surface of LED lens 58. The light rays may be reflected multiple times from inner longitudinal surfaces of tweezer arms 24L, 24R. It should also be understood that all rays which are incident on lower oblique faces 40L, 40R of tweezer arms 24L, 24R at angles greater than a critical angle for total internal reflection, which for polycarbonate plastic is about 39 degrees, will be totally reflected from the lower oblique faces.

As may be understood by referring to FIGS. 6, 7 and 9, light rays totally reflected from lower oblique faces 40L, 40R of tweezer arms 24L, 24R are transmitted downwardly and inwardly through opposed inner facing longitudinally disposed sides 66L, 66R of lower end sections of arms 24L, 24R. Lower sections of inner facing sides 66L, 66R of arms 24L, 24R thus comprise light exit regions for transmitting internally reflected light outward from the arms into an illumination region located between and extending below tips 29L, 29R of the arms.

As may be understood by referring to FIG. 9, lower oblique faces 40L, 40R of tweezer arms 24L, 24R are parallel to lower reflective faces 67L, 67R of grasping tips 29L, 29R. With this arrangement, reflective faces 67L, 67R reflect those light beams 64L, 64R which are incident on faces 66L, 66R of tweezer arms 24L, 24R at angles less than the critical angle, and which would thus otherwise not be effective in illuminating a region between tips 29L, 29R. Light rays externally reflected from faces 67L, 67R of tips 29L, 29R are angled obliquely inwardly and downwards towards a longitudinal vertical center plane of tweezers 20. Thus the externally reflected beams are also effective in illuminating a work space between the tweezer tips 29L, 29R, as shown in FIGS. 6 and 7.

As described above, at least beam splitter lens body 59 and that part of body 21 of tweezers 20 located below the lens body are made of a light transmissive material such as a clear polycarbonate plastic. As will also be understood, body 21 of tweezers 20 must be made of a material which is elastically deformable, so that arms 24L, 24R of tweezers 20 are elastically bowed apart, as shown in FIG. 6. The elasticity of body 21 enables the bowed apart arms 24L, 24R of tweezers 20 to be pressed together between a person's fingers to thus force faces 38L, 38R of tweezer grasping tips 29L, 29R into compressive grasping contact with an object to be manipulated, and spring apart when pressure is removed.

In the embodiment of tweezers 20 described above, the tweezers have a composite construction in which the body 21 of the tweezers and tips 29L, 29R are separate parts, which may be made of different materials. Alternatively, both body 21 and tips 29L, 29R may be made of light transmissive polymer such as fiberglass-filled nylon, which has a hardness great enough to be usable as a material for the grasping tips 29L, 29R. In this embodiment, body 21 and tips 29L, 29R may be fabricated integrally with arms 24L, 24R as a monolithic body, by injection-molding, for example. As described above all light rays which are transmitted downwardly from light source 42 through arms 24L, 24R and impinge lower oblique faces 40L 40R of the arms at angles greater than the critical angle for the particular material from which the arms are fabricated, will be reflected downwardly and inwardly towards a region located between and below the tips of the arms, thus effectively illuminating that region.

FIG. 7 illustrates a feature of the novel illuminating tweezer according to the present invention which makes the tweezers particularly well-suited to performing personal care functions near a person's eyes such as plucking eyebrow hairs. To understand why the illuminating tweezers according to the present invention is particularly well-suited to performing tasks near a person's eyes, it should be noted that typical LED's emit light in a relatively narrow conical beam having an angular width of about 10-20 degrees. Thus a single centrally-located LED may be effective in directly illuminating a work region located in a direction spaced away from a user's eyes. However, if such tweezers were held in a person's hand with the tips of the tweezer arms facing towards the person's eyes, to pluck eyebrow hairs, for example, the intensity of light emitted by the single centrally-located LED and concentrated in a narrow beam would produce an unpleasant, dazzling effect should the beam strike an eye of the person.

In contrast, as shown in FIG. 7, the novel design of the illuminating tweezers according to the present invention eliminates dazzling light in the following way. The narrow cone-angle beam emitted by a single centrally-located LED is split into two beams by a beam splitter, transmitted downwardly through arms 24L, 24R by total internal reflection and transmitted downwardly and outwardly through opposed light exit regions 66L, 66R on inner-facing sides of lower ends of the tweezer arms.

As is shown in FIG. 7, two light beams LBL, LBR exiting through 66L, 66R converge at a location between and below the light exit regions on a center line C/L of the tweezers, at an angle $\alpha$ of about 33 degrees, and diverge in locations below the convergent locations at the same angle. Although the exact value of convergence-divergence angle is, to a certain extent, a matter of design choice, it can be seen from viewing FIG. 7 that the angle is substantially greater than 20 degrees. For the example shown in FIG. 7, the divergence angle for LED illuminating areas below the convergence region is $2 \times \alpha$, i.e., about 66 degrees. Thus the intensity of light which may happen to fall on a user's eyes is substantially less than would be the case if a single LED beam were used to illuminate a work region. Consequently, the design of the illuminating tweezers according to the present invention eliminates the dazzling effect and thus facilitates using the tweezers near a person's eyes.

FIGS. 10-19 illustrate a variation of the illuminating tweezers shown in FIGS. 1-9 and described above, which has stepped tips The tweezers 120 shown in FIGS. 10-19 has a construction substantially similar to that of tweezers 20. Certain elements of stepped-tips tweezers 120 which are substantially similar to analogous elements of tweezers 20 are identified by reference designation numbers increased by 100, e.g., elements 121, 122, etc., analogous to elements 21, 22, etc. A description of the structures and functions of those elements is given above and may be referred to here.

Structural and functional differences between stepped-tips illuminating tweezers 120 and illuminating tweezers 20 will now be described.

As shown in FIGS. 10, 11, and 15-19, the lower end sections 133L, 133R of arms 124L, 124R of stepped-tips illuminating tweezers 120 have a somewhat different shape than lower end sections 33L, 33R of illuminating tweezers 20. Thus, as may be seen best by referring to FIGS. 16A-19, opposed inner facing longitudinally disposed vertical sides 166L, 166R of tweezer arms 124L, 124R each have a stepped, saw-toothed shaped surface 167L, 167R.

Figure 16B:
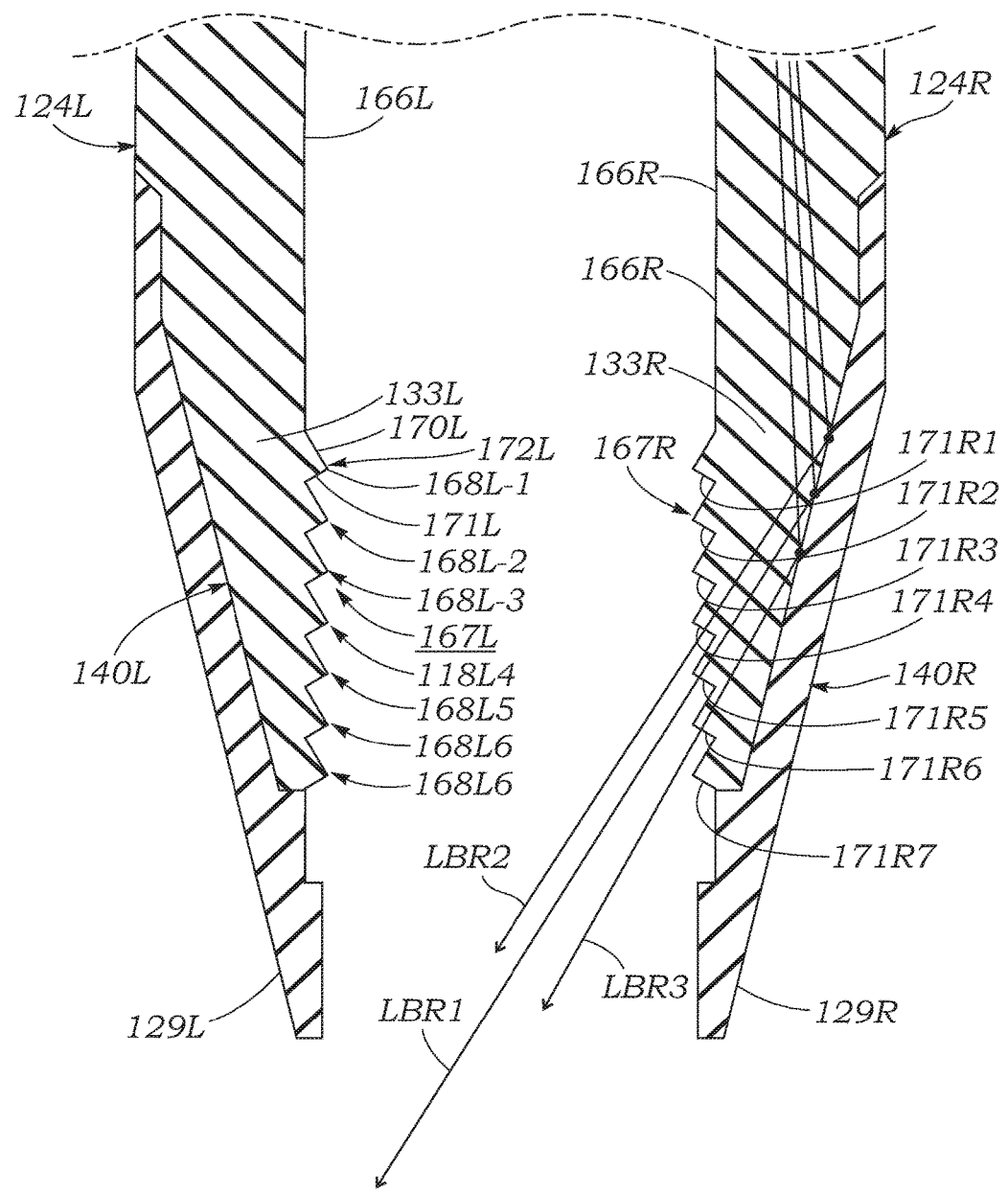
FIG. 16B is an enlarged view similar to that of FIG. 16A, showing paths of off-center light beams to a center path.

As shown in FIGS. 16B and 18, each sawtooth shaped surface such as surface 167L of left tweezer arm 124L consists of a longitudinally disposed column of laterally disposed, sawtooth-like, wedge-shaped light-emitting steps 168L. Each light-emitting step 168L protrudes outwardly from the inner longitudinally disposed side 166L of arm 124L, and inwardly towards opposed arm 124R. As shown in FIG. 16B, each light-emitting step 168L has an upper side plane 170L which extends from inner side 169L of arm 124L, and is angled downwardly and inwardly towards a longitudinal center plane of tweezers 120. Each light-emitting step 168L also has a lower side plane 171 which extends from inner side 169L of arm 124L, and is angled upwardly and inwardly towards a longitudinal center plane of tweezers 120. Thus each lower side plane 171 faces downwardly and inwardly, in the sense that a perpendicular normal to a lower side plane 171, and light rays emitted from the lower side plane, are angled downwardly and inwardly towards a longitudinal center plane of tweezers 120. Each lower side plane 171L intersects the upper side plane 170L of a light-emitting step 168 at a transversely disposed edge linear edge vertex 172L.

In the example embodiment of illuminated tweezers 120 shown in FIG. 16B, each tweezer arm 124L, 124R has seven light-emitting steps, i.e., steps 168-1, 168-2, 168-3, 168-4, 168-5, 168-6, 168-7. As will be explored below, the number of light-emitting steps 168 can be varied.

Referring to FIG. 16A, it may be seen that a typical light beam ray, e.g., LBR5 of a conical beam of rays emitted by LED 155 is transmitted through arm 124R by total internal reflection. Ray LBR5 is incident upon the inner side of an oblique outer surface 140R of arm 124R, at an angle greater than the critical angle of the light transmissive material from which arm 124R is made, and thus is reflected laterally inwardly and downwardly towards inner facing side 166R of lower end section 133R of arm 124R.

In the example shown in FIG. 16A, a first light beam ray LBR1 located within a generally conically shaped beam of light rays emitted by LED 155 and transmitted downwardly through right hand tweezer arm 124R is internally reflected from the inner side of lower oblique surface 140R of the tweezer arm. The reflected beam ray LBR1 is in turn transmitted through the lower upwardly and inwardly angled plane 171R5 of wedge-shaped step 168R-5 which thus serves as a light exit region for light beam ray LBR1 and rays which are close to and approximately parallel to ray LBR1.

Since, as shown in FIG. 16A, light beam ray LBR1 is inclined at a small incident angle to light exit region plane 171R5 of step 168R5, i.e., at an angle nearly perpendicular to plane 171R5, the beam is transmitted through plane 171R5 with little attenuation into an illuminating region located between tips 129L, 129R of tweezers 120.

The novel addition of sawtooth or wedge-shaped light-emitting steps 168 on inner longitudinal surfaces of arms 124L, 124R of tweezers 120, each step having a downwardly facing lower plane surface 171, which serves as a light exit region or window, provides a highly efficient structure for transmitting light conducted downwardly through the tweezer arms into a work space region located between and below tweezer tips 129L, 129R.

A preferred embodiment of modified tweezers 120 includes a vertically disposed, columnar series of steps 168. Thus, as shown in FIG. 16B, light-emitting steps 168R4, 168R3, 168R2, and 168R1 located above step 168R5 are effective in transmitting light beam rays such as ray LBR2, which are internally reflected from surface 140R at larger incident and reflected angles than beams LBR1.

Similarly, light-emitting steps 168R6, 168R7 located below step 168R5 are effective as light exit regions for transmitting light beam rays such as rays LBR3 which are incident upon and reflected from surface 140R at smaller angles.

As may be envisioned by viewing FIG. 16B, the angular width of a generally conically shaped beam of light rays emitted by LED 155, a fraction of which cone is shown between rays LBR2 and LBR3, will dictate the optimum number and location of light-emitting steps 168 required to provide light exit regions for efficiently transmitting internally reflected light beams into a work space located between the tips 129L, 129R of tweezers 120. In tests of the present invention, it was found that the intensity of illumination between and below tips 129L, 129R of tweezers 120 increased substantially from that provided by a single light-emitting step 168 as the total number of light-emitting steps was increased to three and four, and to a lesser extent when the total number of light-emitting steps was increased to five, six, and seven.

Figure 17:
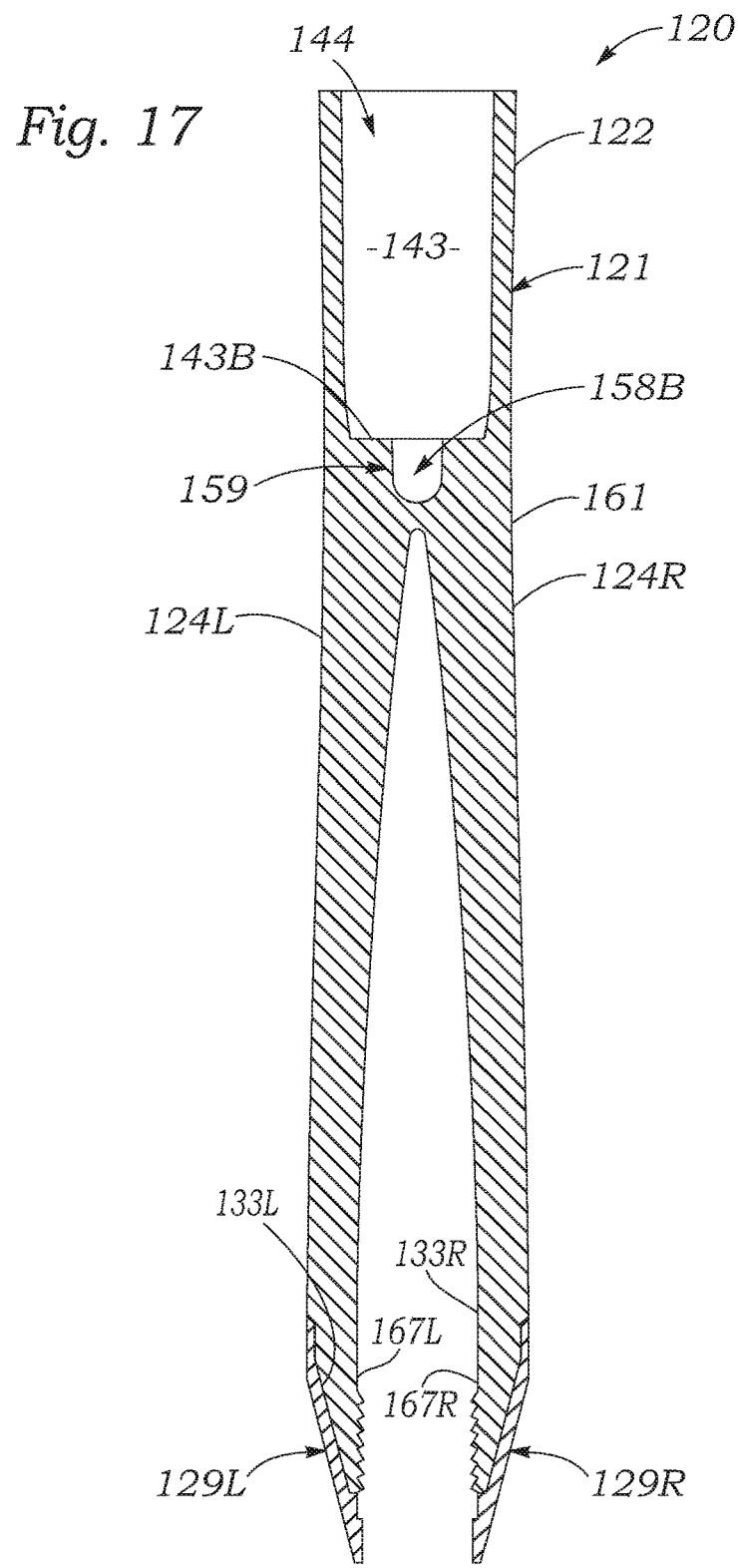
FIG. 17 is a fragmentary longitudinal sectional view of the illuminating tweezers of FIG. 10 showing the tweezers with a light source thereof removed.

As may be seen best by referring to FIGS. 15 and 17, tweezers 120 also has a simplified arrangement for conducting light emitted by LED 155 into arms 124L, 124R of the tweezers. Thus, as shown in FIG. 17, the lens body 59 of tweezers 20 is replaced by a unitary region 159 of web 161 of tweezers 120. Also, light source cavity 143 of tweezers 120 has a cylindrical shape. A bottom circular wall of cavity 143 has extending downwards therefrom a coaxially centrally located blind cylindrical bore 158B. Bore 158B receives conformally therein the cylindrical body and lower hemispherically shaped lens 158 of LED 155.

Figure 13:
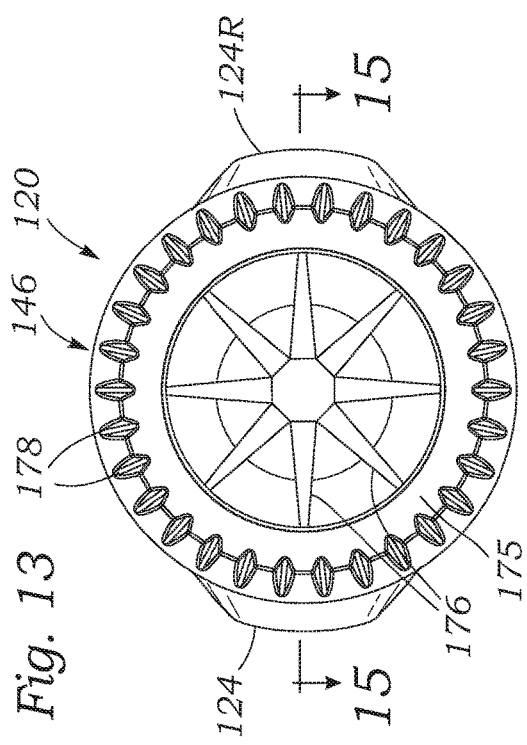
FIG. 13 is a top plan view of the Illuminating tweezers of FIG. 10.
Figure 14:
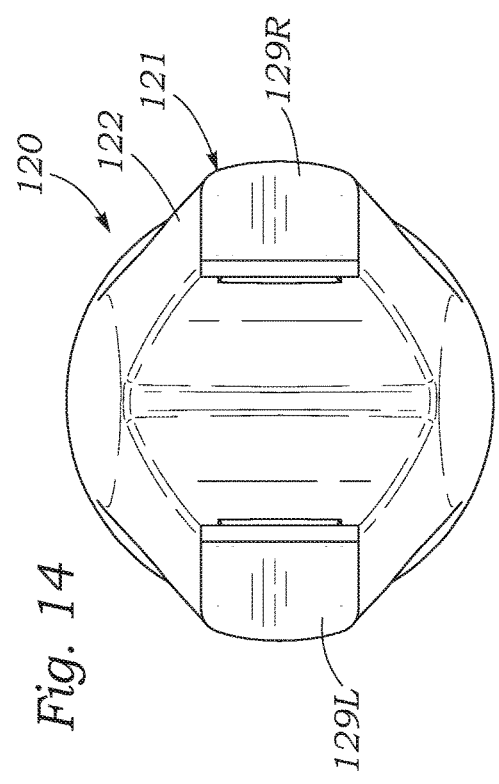
FIG. 14 is a bottom plan view of the Illuminating tweezers of FIG. 10.

As may be seen best by referring to FIGS. 10, 11, and 13, tweezers 120 has a switch control knob 146 that includes a frustoconically-shaped lower section 173 which tapers radially inwardly from a circular cross-section base plane 174 to a smaller diameter upper circular truncating plane 175. Upper truncating plane 175 has extending upwardly therefrom a star-shaped arrangement of six finger grip wings 176 which radiate from a central longitudinal axis of switch control knob 146. Wings 176 have in elevation view a right-triangular shape, and are spaced circumferentially apart at equal intervals.

As shown in FIGS. 11-13, switch control knob 146 also has formed in the longitudinal wall surface 177 thereof a series of finger grip grooves 178 which extend through the upper surface of upper truncating plane 175 of the knob, and are spaced circumferentially apart at equal intervals.

Figure 22:
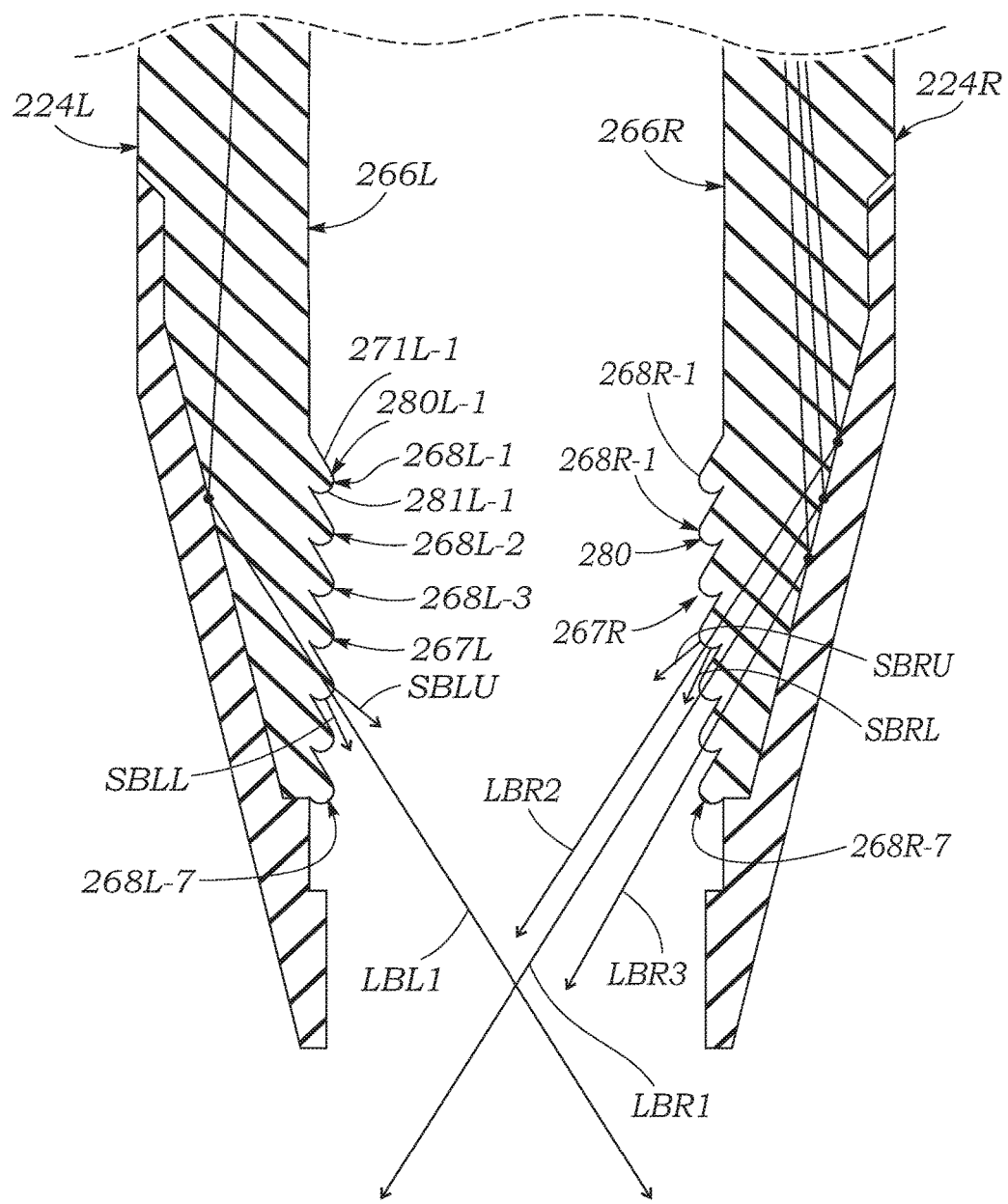
FIG. 22 is a fragmentary longitudinal sectional view of the illuminated tweezers of FIGS. 20 and 21, showing patterns of light beams emitted diffusely by steps of the tweezers.

FIGS. 20-22 illustrate a modification of the stepped-tips illuminating tweezers 120 described above. As may be understood by referring to FIGS. 20-22, modified stepped-tips tweezers 220 has light-emitting steps 268 which are shaped somewhat differently than light-emitting steps 168 of tweezers 120. As described above, steps light-emitting 168 of tweezers 120 each have a lower upwardly and inwardly angled, downwardly facing planar surface 171, which serves as a light exit region or window. As shown in FIGS. 20-22, a lower downwardly facing plane 271 of each light-emitting step 268 of modified tweezers 220 has extending therefrom a convex, arcuately curved protrusion 280 which has a shape approximately that of a semi-cylinder.

The protrusion 280 of each step 268 has generally the shape of a semi-cylinder which is disposed transversely to the inner facing vertical side 266 of a tweezer arm 224, in a fore-and-aft direction. Each protrusion 280 has a semi-cylindrical outer surface 281 and functions as a semi-cylindrical lens.

Protrusion 280 is made of a plastic material which preferably has a diffuse light transmission characteristic, and is preferably molded integrally with an arm 224. Also, the surface 281 of each light-emitting step 268 preferably has a roughened or matte, light-diffusing finish. With this modification of light exit surfaces 281 of steps 268 of tweezers 220, light rays such as rays LBR1, LBR2, and LBR3 shown in FIG. 16B, will be partially scattered into upper and lower scattered rays such as rays SBLU, SBLL, SBRU, SBRL by the curved, diffusely transmitting surfaces 281 of steps 268. Thus light emerging from surfaces 281 of tweezers 220 will be diffused and distributed over relatively larger solid angles than light beams emerging from planar surfaces 171 of steps 168 of tweezers 120. Consequently, the intense brightness of an LED light source which is softened in the modified step-tips tweezers 120 is even further diffused and softened by the curved light exit surfaces 281 of tweezers 220.

What is claimed is:

1. An illuminating tweezers for illuminating, grasping and manipulating small objects, said tweezers comprising;
   a. a tubular barrel,
   b. a pair of first and second longitudinally elongated, laterally spaced-apart flexible arms which depend downwardly from opposite longitudinal sides of said barrel, said arms being light transmissive and having confronting, laterally spaced-apart lower ends, said arms being movable towards one another to thereby grasp objects located between said lower ends of said arms,
   c. a light source located within said barrel, said light source arranged to transmit light into light entrance regions located in upper parts of said arms, and said arms being arranged to transmit light from said light source through said arms and outwardly through laterally opposed light exit regions of lower ends of said arms to thereby illuminate a region between said lower ends of said arms,
   d. each of said light exit regions including at least one light-emitting step having a light exit surface extending from a laterally inwardly located side of each arm and facing downwardly and inwardly towards a longitudinally disposed center plane of said arm, and
   e. each of said light-emitting steps including at least a first protrusion extending from a laterally inwardly located side of said tweezer arm, said protrusion having a wedge-shaped cross-section which includes an upper side which is angled downwardly and inwardly towards a longitudinal center plane of said tweezers, and a lower side which is angled upwardly and inwardly and faces downwardly and inwardly towards a longitudinal center plane of said tweezers, said lower side comprising said light exit surface.

2. The illuminating tweezers of claim 1 wherein at least one of said arms and said light-emitting steps is composed at least partially of a diffusely transmissive material.

3. The illuminating tweezers of claim 1 further including at least a second wedge-shaped protrusion spaced longitudinally from said first protrusion.

4. The illuminating tweezers of claim 1 including a longitudinally arranged series of said wedge-shaped protrusions.

5. The illuminating tweezers of claim 4 wherein said series of wedge-shaped protrusions consist of between about two and about seven protrusions.

6. An illuminating tweezers comprising;
   a. a pair of first and second longitudinally elongated, laterally spaced apart flexible arms which are joined together at upper ends thereof and have laterally spaced apart lower ends, said arms being movable towards one another to thereby grasp objects located between said lower ends of said arms, at least one of said arms being at least partially light transmissive,
   b. a light source arranged to transmit light into a light entrance region of at least one of said arms, said arm being arranged to transmit light from said light source through said arm and through a light exit region at a lower end of said arm to illuminate a region between said lower ends of said arms, said light exit region comprising;
   c. at least a first protrusion extending from said arm, said protrusion having an outer face which is angled downwardly and inwardly towards a longitudinal center plane of said tweezers.

7. The illuminating tweezers of claim 6 wherein said outer face of said protrusion has a convex shape.

8. The illuminating tweezers of claim 6 wherein said outer face of said protrusion has a convex, arcuately curved shape.

9. The illuminating tweezers of claim 6 wherein said protrusion has a generally semi-cylindrical shape.

10. The illuminating tweezers of claim 6 further including at least a second protrusion spaced longitudinally from said first protrusion.

11. The illuminating tweezers of claim 6 wherein said protrusion has a wedge shape.

12. An illuminating tweezers for illuminating, grasping and manipulating small objects, said tweezers comprising;
    a. a tubular barrel,
    b. a pair of first and second longitudinally elongated, laterally spaced-apart flexible arms which depend downwardly from opposite longitudinal sides of said barrel, said arms being light transmissive and having confronting, laterally spaced-apart lower ends, said arms being movable towards one another to thereby grasp objects located between said lower ends of said arms,
    c. a light source located within said barrel, said light source arranged to transmit light into light entrance regions located in upper parts of said arms, said light source comprising a single light emitter and a beam splitter for splitting light emitted therefrom into first and second beams that are diverted into said first and second arms, and said arms being arranged to transmit light from said light source through said arms via multiple internal reflections therewithin and outwardly through laterally opposed light exit regions of lower ends of said arms to thereby illuminate a region between said lower ends of said arms, and
    d. each of said light exit regions including at least one light-emitting step having a light exit surface extending from a laterally inwardly located side of each arm and facing downwardly and inwardly towards a longitudinally disposed center plane of said arm.

13. The illuminating tweezers of claim 12 wherein at least one of said arms has on a laterally outwardly located side of a lower end thereof an oblique surface that angles downwardly and inwardly toward a longitudinal center plane of said tweezers.

* * * * *